W. M. Sloane,
Crozing Staves.
No. 29,199.  Patented July 17, 1860.
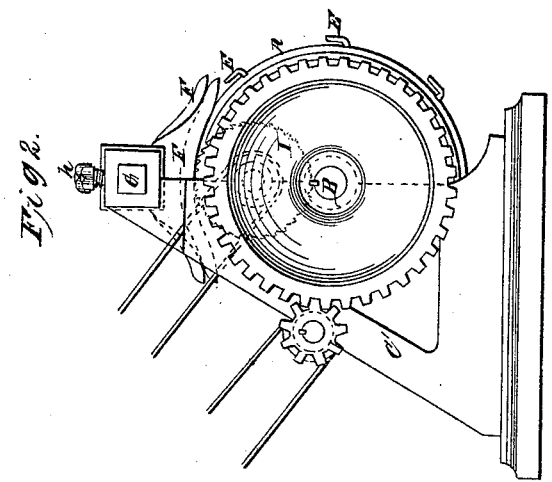
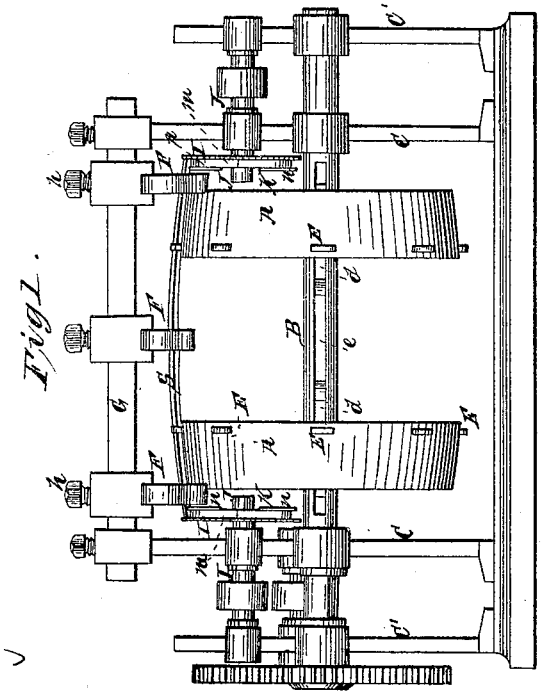
Witnesses.
Inventor.

UNITED STATES PATENT OFFICE.

WM. M. SLOANE, OF BUFFALO, NEW YORK.

STAVE-MACHINE.

Specification of Letters Patent No. 29,199, dated July 17, 1860.

*To all whom it may concern:*

Be it known that I, WILLIAM M. SLOANE, of the city of Buffalo, county of Erie, and State of New York, have invented certain new and useful Improvements in Stave Chamfering and Crozing Machines; and I do hereby declare that the following is a full, clear, and exact description thereof, reference being had to the accompanying drawings and the letters of reference marked thereon.

Figure I is a side elevation of my improved machine. Fig. II is an end elevation of the same.

Letters of like name and kind refer to like parts in each of the figures.

A, A are two adjustable barrel form drums upon which the staves are placed to be fed to the chamfering and crozing tools. They are made in a barrel form—that is to say, they are like an end section of a barrel, so that when placed in position on the shaft and a stave is made to fit closely to both drums it will be in the same form or position that it will occupy when set up in a barrel. They are made adjustable on the shaft (B) so as to be placed at a greater or less distance apart on the shaft and thereby accommodated to staves of different length and thickness. A slot (*e*) is made lengthwise of the shaft and keys (*d, d,*) working in the slot and driven in under the hub of the drum will hold the drum securely where placed.

(C, C',) are upright frames in which the shaft (B) has journal bearings; E, stops or hooks arranged on the drums and which hold the stave to the drums while passing in to the action of the chamfering and crozing tools; (F,) formers, under which the stave must pass as it is carried along by the revolving drums. These formers are adjustable on the bar (G) by means of the set screws (*h*) so as to be accommodated to any required length or thickness of stave. The formers at the end of the bar are placed over or nearly so the crozing tool and are so constructed and placed that the stave as it passes under must be bent down upon the drums into the exact form or nearly so which it will occupy when set up in the barrel.

The crozing and chamfering is done while the stave is under the formers. The middle former is adapted to the bilge or middle of the barrel.

I, I, are circular saws which cut the stave to its proper length; J, J, shafts upon which the saws (I, I,) are supported. These shafts have journal bearings in the frames (C', C',) over those of the shaft (B).

(K, K,) are cutter heads on same shafts as circular saws (I, I,) and having cutters or chamfering tools (*m*) which chamfer the ends of the stave and cutters or crozing tools (*n*) which croze them. These cutter heads and the saws (I I) are adjustable upon their shafts (J, J,) for staves of different length.

S, represents a stave in its position upon the drums and under the formers while the saws chamfering and crozing tools are performing their work.

Operation: This machine is adapted and arranged for chamfering and crozing staves which have been previously bent and dressed in the barrel form. Staves thus bent and dressed in the barrel form are laid upon the revolving drums so as to be caught by the hooks (E) and carried under the formers and to the saws and chamfering and crozing tools as represented in (Fig. I). The stave is sawed to its proper length and chamfered and crozed at both ends at the same time and while it lies upon the drums in the exact form or nearly so which it will take when set up in a barrel. The drums being adjustable or movable on the shaft (B) may be moved inwardly or toward each other.

I do not claim broadly the use of revolving drums upon which the stave is laid for the purpose of being carried to the chamfering and crozing tools; but I do claim—

The application and use of the drums (A, A,) when constructed in the barrel form in combination with the formers F F F so that the stave may be chamfered and crozed while it is bent in the exact form or nearly so which it will occupy when set up in the barrel substantially as described.

WILLIAM M. SLOANE.

Witnesses:
  A. M. WHEELER,
  W. H. FORBUSH.